US009544378B2

(12) United States Patent
Brown

(10) Patent No.: US 9,544,378 B2
(45) Date of Patent: Jan. 10, 2017

(54) CORRELATION OF ACTIVITIES ACROSS A DISTRIBUTED SYSTEM

(71) Applicant: Red Hat, Inc., Raleigh, NC (US)

(72) Inventor: Gary Peter Brown, Hitchin (GB)

(73) Assignee: Red Hat, Inc., Raleigh, NC (US)

( * ) Notice: Subject to any disclaimer, the term of this patent is extended or adjusted under 35 U.S.C. 154(b) by 351 days.

(21) Appl. No.: 13/827,039

(22) Filed: Mar. 14, 2013

(65) Prior Publication Data
US 2014/0280871 A1 Sep. 18, 2014

(51) Int. Cl.
*G06F 15/173* (2006.01)
*H04L 29/08* (2006.01)

(52) U.S. Cl.
CPC .............. *H04L 67/22* (2013.01); *H04L 67/10* (2013.01)

(58) Field of Classification Search
CPC ................................ H04L 51/36; H04L 43/04
USPC ....................................................... 709/224
See application file for complete search history.

(56) References Cited

U.S. PATENT DOCUMENTS

| 6,920,468 | B1* | 7/2005 | Cousins ............ G06F 17/30507 |
| 7,996,853 | B2* | 8/2011 | Bendiksen .......... G06F 11/3495 719/328 |
| 8,850,452 | B2* | 9/2014 | Karakkattillathu Vishnu Namboothiri ................. 719/313 |
| 2007/0294224 | A1* | 12/2007 | Heler ................................ 707/3 |
| 2010/0042686 | A1* | 2/2010 | Takahashi et al. ............ 709/205 |
| 2010/0222933 | A1* | 9/2010 | Smith et al. .................. 700/286 |
| 2013/0019008 | A1* | 1/2013 | Jorgenson et al. ........... 709/224 |
| 2013/0246569 | A1* | 9/2013 | Shen et al. .................... 709/217 |
| 2013/0339473 | A1* | 12/2013 | McCaffrey et al. .......... 709/216 |

* cited by examiner

*Primary Examiner* — Jason Recek
(74) *Attorney, Agent, or Firm* — Lowenstein Sandler LLP

(57) ABSTRACT

A method and system for tracking activities relating to a common transaction executed across multiple services of a distributed computing environment. An aggregator receives intra-service activity information from collectors associated with a first service and a second service of the distributed computing environment. The aggregator identifies a first inter-service communication correlation linking the intra-service activity information of the first service to a first inter-service message. The aggregator further identifies a second inter-service communication correlation linking the intra-service activity information of the second service to the second inter-service message. The aggregator identifies an inter-service communication correlation linking the first inter-service message with the second inter-service message and associates the intra-service activity of the first service with the intra-service activity of the second service using the inter-service communication correlation.

18 Claims, 4 Drawing Sheets

US 9,544,378 B2

CORRELATION OF ACTIVITIES ACROSS A DISTRIBUTED SYSTEM

TECHNICAL FIELD

Embodiments of the present disclosure relate to a distributed computing system, and more specifically, to correlating activities across the distributed computing system.

BACKGROUND

A distributed computing system may include multiple services provided by multiple computing systems administered by independent entities that do not share a common infrastructure. The multiple services may each independently perform activities or tasks and coordinate with one another in order to execute a transaction (e.g., a business transaction) across the multiple services.

DETAILED DESCRIPTION

Figure 1:
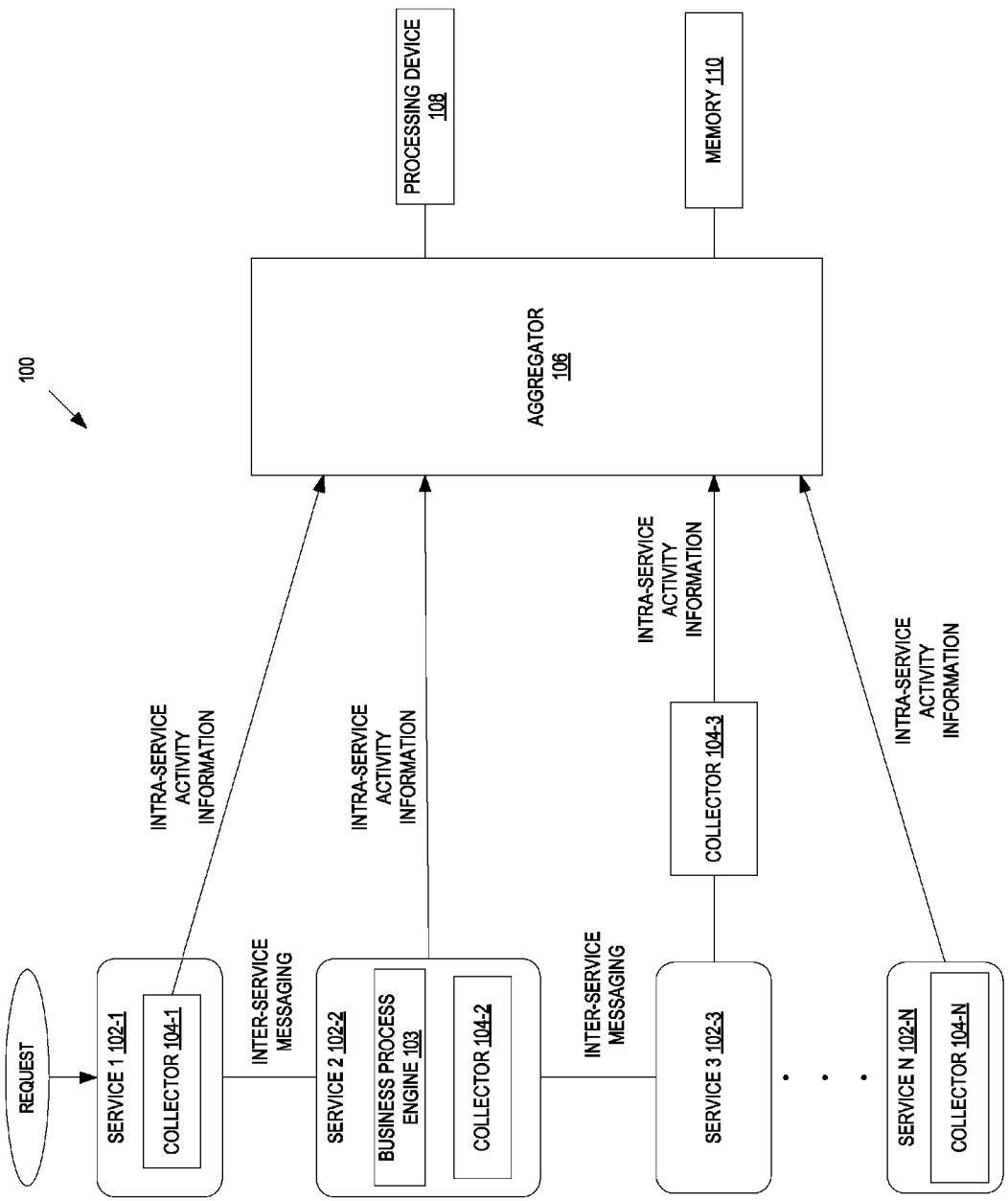
FIG. 1 is a block diagram of an example computing system including an aggregator for tracking activity information relating to multiple services in a distributed computing environment, according to aspects of the present disclosure.

In a distributed computing system, it may be desired to collect information pertaining to the performance of activities by multiple services that are associated with the execution of a common transaction (e.g., a business transaction). In a conventional system wherein multiple transactions are executed across multiple services, it is difficult to determine which logged or tracked activities performed by the respective services are associated with which transactions.

Some conventional systems attempt to simplify the associating of activities to a transaction by assigning a transaction identifier to all messages that are exchanged between the various services which are coordinating to execute the transaction. Passing of the transaction identifier in inter-service messages assists in correlating the activities associated with processing the messages to the common transaction. Although this approach provides for an accurate correlation of service activities to an associated transaction, a common infrastructure among the multiple services is required. Accordingly, the passing and tracking of transaction identifiers can not be used to correlate activity information to a transaction being performed on a distributed system including multiple independent services that do not share a common infrastructure.

The present disclosure relates to methods and systems that provide for the correlation of activity information performed by multiple services to document the execution of a transaction across those services in a distributed computing environment. Advantageously, the methods and systems provide for the accurate correlation of the multiple intra-service activities being performed by the multiple services relating to a common transaction, without requiring an explicit transaction identifier to be passed between the services during execution of the transaction. Moreover, the present disclosure provides for the aggregation of multiple sets of intra-service activity and the correlation of that intra-service activity with communications exchanged between different services (i.e., "inter-service communications") to provide for an end-to-end linking of service activities and communications relating to the execution of a common transaction across a distributed computing environment.

According to aspects of the present disclosure, an aggregator is provided for communication with multiple collectors and/or business process engines each associated with one or more services of a distributed computing system. The collector logs information relating to the one or more activities performed by an associated service (i.e., "service activity information") and information relating to any inter-service messaging (e.g., an outbound message to another service or computing component (e.g., a user device) or an inbound message received from another service or computing component (e.g., a user device)). The service activity information and the inter-service messaging information (collectively the "intra-service activity information") tracked by the collector includes information relating to the activities, tasks, and transactions performed by the service in response to an incoming message or request and associated inter-service communications. In an example, the intra-service activity information identifies "local" correlation data (e.g., the activity information performed locally by a particular service) including an identification of the service, an identification of the activities performed by the service, and the one or more inter-service communications executed by the service.

The aggregator receives and analyzes multiple sets of intra-service activity information received from collectors and/or business process engines associated with multiple services. For each set of intra-service activity (e.g., service-specific activity), the aggregator correlates the service activity information to any associated messaging performed by the service (e.g., an inter-service communication) to identify an intra-service correlation. The aggregator further correlates associated messages between a first service and a second service to establish an inter-service communication correlation. For example, an inter-service communication correlation may be established for an inter-service message from the first service to the second service by linking a "send" message from the first service to a corresponding "receive" message at the second service.

Accordingly, by identifying the inter-service communication correlations the aggregator is able to link the respective intra-service activity information received from multiple services that are executing a common transaction (e.g., the first service and the second service) and use those correlations to link service activity performed across the distributed computing environment which relates to a common transaction. In addition, the methods and systems of the present invention provide for the logging, tracking and correlating of activities performed by multiple services that do not share a common infrastructure, without requiring the multiple services to track and exchange an explicit transaction identifier during the execution of the transaction.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

FIG. 1 is a block diagram that illustrates an example computing environment 100 including an aggregator 106 executed by a processing device 108 and coupled to a memory 110 (e.g., storage including volatile memory devices (e.g., random access memory (RAM)), non-volatile memory devices (e.g., flash memory), a magnetic hard disk, a Universal Serial Bus (USB) solid state drive, etc., a local disk, an external disk, and/or other types of memory devices).

In an embodiment, the aggregator 106 is a software component (e.g., a set of instructions residing in memory 110) executable by a processing device (e.g., processor 108) which correlates the service activity performed by the multiple services 102 to a corresponding transaction, as described in detail below. The aggregator 106 may be executed by any suitable computing device, such as a server computer, a desktop computer, a mainframe, a workstation, a personal computer (PC), a mobile phone, a palm-sized computing device, etc.

The computing environment 100 further includes multiple services 102 (e.g., Service 1 102-1, Service 2 102-2, Service 3 102-3, . . . and Service N 102-N) in communication with a collector 104 (e.g., Collectors 104-1, 104-2, 104-3, . . . and 104-N) that reside on multiple machines. In one example, each service 102 resides on a separate machine. In another example, at least some of the services 102 are hosted by the same machine. The services 102 are configured to perform one or more activities or tasks ("service activity") relating to a one or more transactions (e.g., a business transaction) which may be initiated by a request (e.g., a user request). The services 102 further execute messages or communications with other services relating to the execution of related activities ("inter-service messaging").

The collector 104 is a software component (e.g., a set of instructions) executing on the same machine as an associated service 102 (e.g., collectors 104-1, 104-2 and 104-N of FIG. 1) or on a different machine as an external agent in communication with an associated service 102 (e.g., collector 104-3 of FIG. 1). The collector 104 is configured to receive, extract, collect, assemble, log, tracks, and/or record information relating to the service activity and inter-service messaging (collectively the "intra-service activity information") from one or more services 102 and provide the intra-service activity to the aggregator 106. For example, the intra-service activity may be provided to the aggregator by any suitable method, including via a network (e.g., a public network such as the Internet, a private network such as a local area network (LAN), or a virtual private network (VPN)), by storing the intra-service activity in a database which may be read by the aggregator 106, etc. The intra-service activity information may be maintained in any suitable fashion. For example, the intra-service activity information may be stored locally to where the service 102 and collector 104 are executing or may be recorded in a remote storage. In an embodiment, the content and format of the intra-service activity information may be configurable and based on the instrumentation of the service 102, and may be configured to capture various activities that occur either sequentially or concurrently. In an example, the intra-service activity information may be in any suitable format, such as, for example, text based logs or in XML format. In an example, the collector 104 may collect the intra-service activity information by scraping the text and/or XML messages maintained in the activity logs of the service 102.

In an example, the computing environment 100 may include a business process engine 103. The business process engine 103 is a software component (e.g., a set of instructions) executing on the same machine as the service 102 (e.g., Service 2 102-2 in FIG. 1) to track multiple threads of execution relating to multiple individual tasks performed by the service by associating those threads of execution with a business process instance identifier for all of the tasks that the engine schedules and coordinates. In an example, a service may include both a business process engine 103 and a collector 104 collecting intra-service activity information and providing the intra-service activity information to the aggregator 106.

Advantageously, the aggregator 106 collects and aggregates intra-service activity information relating to multiple services in a distributed computing environment and correlates the multiple sets of intra-service activity information associated with a common transaction, without using, tracking, or exchanging a transaction identifier during execution of the transaction.

Figure 2:
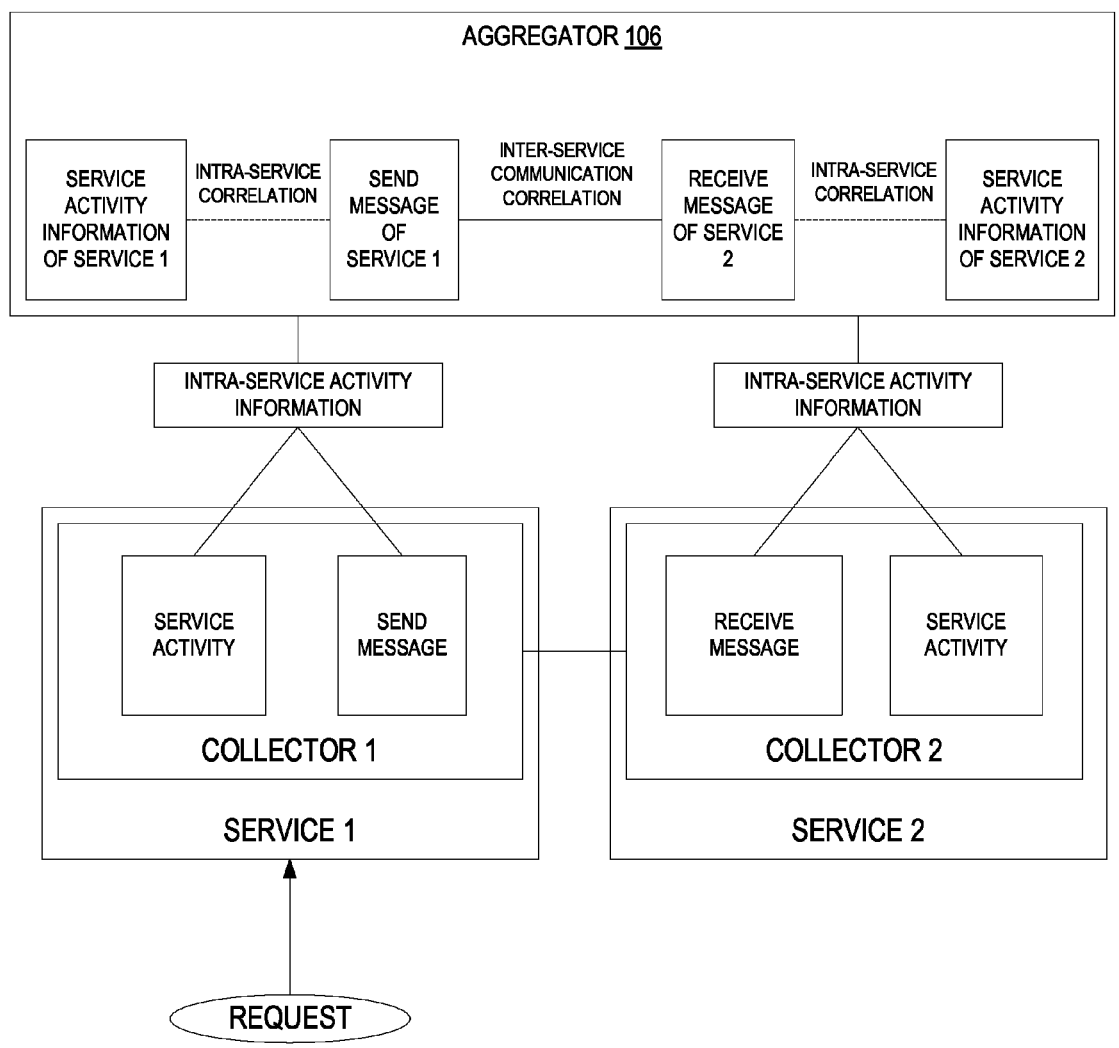
FIG. 2 is a block diagram of an example computing system including multiple services providing activity information to an aggregator, according to aspects of the present disclosure.

FIG. 2 is a block diagram illustrating the aggregator 106 in communication with multiple collectors (Collector 1 and Collector 2) associated with multiple services 102 (Service 1 and Service 2). As shown in FIG. 2, Service 1 receives a request to perform one or more activities or tasks. In response, Service 1 performs service activities relating to the request and the service activity leads to an inter-service communication with a second service (Service 2). The inter-service communication involves a "send message" sent by Service 1 and logged by Collector 1. The inter-service communication also involves corresponding "receive message" information logged by Collector 2. In an example, Collector 1 bundles the information relating to the service activity performed by Service 1 and the "send" message to form a set of intra-service activity information and provides Service 1's intra-service activity information to the aggregator 106. Likewise, Collector 2 bundles the information relating to the service activity performed by Service 2 and the "receive message" to form a set of intra-service activity information and provides Service 2's intra-service activity information to the aggregator 106.

The aggregator 106 identifies an intra-service correlation linking the service activity information of Service 1 to the "send message" information of Service 1. The aggregator 106 further identifies an intra-service correlation linking the service activity information of Service 2 to the "receive message" information of Service 2. In an example, the intra-service correlation is determined by identifying a common thread of execution between the service activity information and the messaging information (e.g., the service activity and the send message are part of the same thread of execution of Service 1). In addition, the aggregator 106 performs an inter-service communication correlation linking the send message of Service 1 to the receive message of Service 2, as described in greater detail in accordance with FIG. 3. Using the inter-service communication correlation, the aggregator 106 is able to link or associate the two sets of intra-service activity information of Service 1 and Service 2 and identify the execution of a common transaction across those services.

Although FIG. 2 illustrates an example including the activities and inter-service communications between two services, it is noted that any number of services may communicate within the distributed computing environment, and as such, correlations between multiple intra-service activity sets and multiple inter-service communications may be performed by the aggregator. In addition, the aggregation may be performed for any number of services, using the inter-service messaging between those services as a link between the respective intra-service activity information sets. For example, Service 1 in FIG. 2 may also send messages to a third service (not shown). In this example, the aggregator 106 receives information relating to two "send" inter-service messages from the collector associated with Service 1. In an example, the two "send" messages may include different sets of fields that may be used by the aggregator 106 for correlating the respective "send" messages of Service 1 to the respective "receive" messages of Service 2 and the third service.

Figure 3:
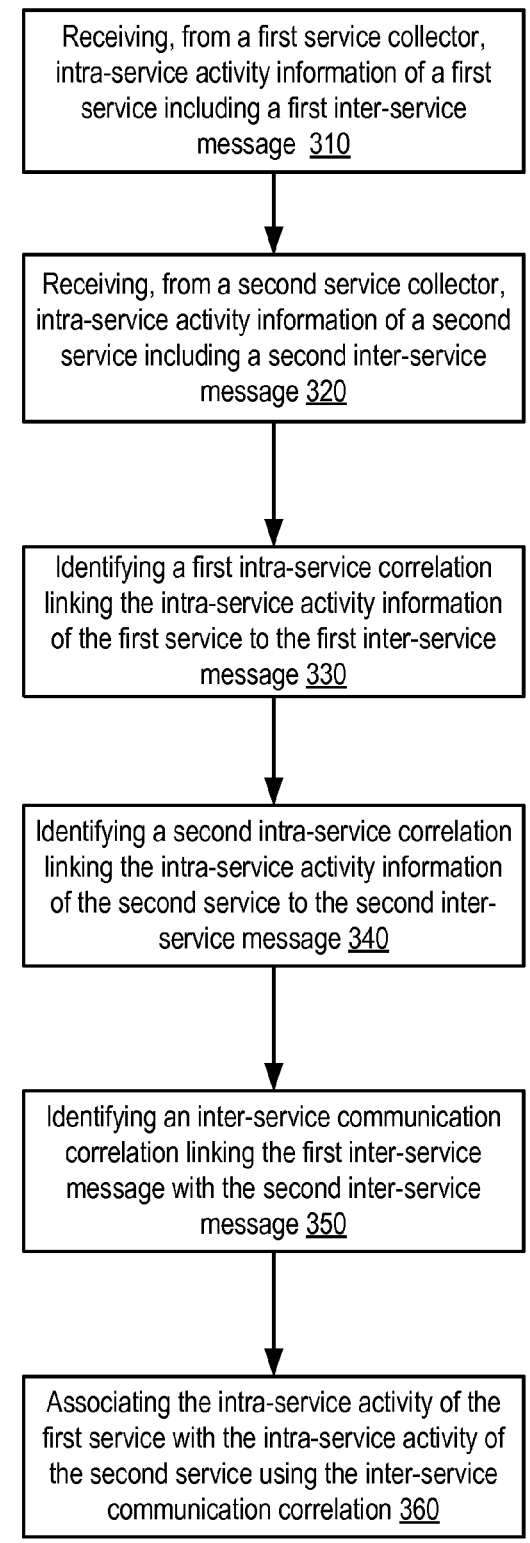
FIG. 3 is a flow diagram of an example method for correlating activity information relating to multiple services in a distributed computing environment, according to aspects of the present disclosure.

FIG. 3 is a flow diagram illustrating an example of a method 300 relating to the operation of an aggregator (e.g., the aggregator 106 of FIGS. 1 and 2). For example, the method 300 may be performed by a computer system 400 of FIG. 4 that may include hardware (e.g., circuitry, dedicated logic, programmable logic, microcode, etc.), software (e.g., instructions run on a processing device), or a combination thereof.

In block 310, the aggregator receives, from a collector associated with a first service, intra-service activity information including a first inter-service message (e.g., the "send message" shown in FIG. 2). In block 320, the aggregator receives, from a collector associated with a second service, intra-service activity information including a second inter-service message (e.g., the "receive message" shown in FIG. 2).

In an example, when a service receives a request (e.g., a user request or a communication from another service), the service initiates a thread of execution (e.g., a unit of work associated with the request). The thread of execution has a transaction identifier and all activities performed within that thread of execution share the common transaction identifier. The thread of execution may include the sending of a communication from the first service to a second service (e.g., an outgoing communication). The outgoing communication is received by the second service as an incoming communication, which in turn results in the creation of and association with a local thread of execution within the second service.

The activities, messages, and associated transaction identifiers executed within the common thread of execution may be included in the intra-service activity information captured by the controller and provided to the aggregator. In an example, a service using an XA architecture may initiate a thread of execution using the XA protocol, wherein the activities within the transaction are coordinated and controlled by an XA transaction manager. In an example, the XA transaction manager may coordinate the collection of intra-service activity information locally in the service, and the collected intra-service activity is provided by the collector to the aggregator upon completion of the transaction. In an example, collected intra-service activity information may be discarded if the transaction were rolled back or otherwise not completed by the XA transaction manager.

In an example, the intra-service activity information may be collected and provided to the collector (for provisioning to the aggregator) by a dedicated business process engine that is internal to the service (e.g., business process engine 103 of Service 2 102-2 in FIG. 1). In this example, the business process engine may employ multiple threads of execution for multiple individual tasks managed by the business process engine. The business process engine tracks the multiple threads of execution by associating those threads of execution with a business process instance identifier for all of the tasks that it schedules and performs. For example, when a service receives a request (or other message), the business process engine initiates a thread of execution and assigns to it a unique business process instance identifier. In an example, if part of a transaction is executing within a business process engine, the activities performed on behalf of that business process instance are associated with a particular business process instance identifier. The business process identifier assigned by the business process engine may be included in the intra-service activity information and used by the aggregator in correlating associated service activities. In an example, a service includes a collector and a business process engine, wherein the business process engine provides the collected intra-service activity information to the collector for provisioning to the aggregator 106 (e.g., Service 2 102-2 shown in FIG. 1).

In block 330, the aggregator identifies a first intra-service correlation linking the intra-service activity information of the first service to the first inter-service message. As described above, the aggregator may determine the correlation by identifying service activities sharing a common scope (e.g., a thread of execution, an XA transaction, and/or a business process instance identifier) with the first inter-service message. In an example, the service activity information generated by the first service as a result of the execution of a part of a transaction within the first service may be correlated based on the activities and a "send message" having a common scope (e.g., activities within a common thread of execution or activities relating to a common eXtended Architecture (XA) transaction).

In block 340, the aggregator identifies a second intra-service correlation linking the intra-service activity information of the second service to the second inter-service message (e.g., in FIG. 2, correlating the receive message of Service 2 with the service activity of Service 2 based on their correspondence with a common thread of execution). In block 350, the aggregator identifies an inter-service communication correlation linking the first inter-service message with the second inter-service message. In the example shown in FIG. 2, the aggregator identifies an inter-service communication correlation between the "send message" of Service 1 and the "receive message" of Service 2. Advantageously, the inter-service communication correlation may be used to link the activities that occurred within the first service with related activities that occur in the second service.

In an example, if a messaging environment (e.g., Java Message Service (JMS), a publish-subscribe platform, etc.) is employed for the exchanges of message between services, a unique message identifier is transmitted with the message payload. The message identifier may be used to correlate the message between the sending service and the receiving service and determine the inter-service communication correlation.

In an example, if a service invocation framework (e.g., the Web Services Invocation Framework (WSIF), SOAP, etc.) is employed for the exchange of messages between services, header information in messages exchanged between the services may include meta-information, such as unique identifier information that may be used to correlate the message between the sending service and the receiving service and determine the inter-service communication correlation.

In an example, the message content itself may be used to provide a unique "identity" to correlate a sending service and a receiving service. For example, correlation identifiers may be employed in certain communication languages and protocols (e.g., WS-BPEL, WS-CDL, BPMN2, etc.). The correlation identifiers within the message content may refer to high level information relating to a global transaction identifier associated with a particular transaction (e.g., an order identifier in a business transaction such as a product order) that may be used by the aggregator to correlate the inter-service message to the related transaction. In an example, the global transaction identifier may include the content of one or more fields of the message which may be used to identify an inter-activity message correlation.

In an example, the aggregator may select multiple fields (e.g., a customer name, an item code, a customer address, etc.) of a message occurring within a particular time (e.g., a first send message) and use the content in the fields to formulate a unique identifier for the message. For example, for a business transaction involving the purchase of goods, a first message taking place at first particular time (e.g., time 1) may include a customer name field including content (e.g., customer name=B. Smith) and an item code including content (item code=1234), and the content of those fields may be combined to form a unique identifier (e.g., BSmith-Item12345). The aggregator may then identify any messages occurring within a selected time frame and identify matches among the unique identifiers of those messages occurring in the selected time frame. In example, if the selected time frame includes time 1, the aggregator may use the unique identifier of the first send message (e.g., a message sent from the first service to a second service) to correlate the first send message to a receive message of the second service (e.g., a second message occurring a second particular time) having the same unique identifier and occurring within the selected time frame.

In an embodiment, the aggregator may be configured to apply a rules-based approach to correlating the inter-service communications wherein the aggregator looks at all messages occurring within a selected time frame (e.g., a one second span of time) and identify unique fields within those messages and use the unique fields to determine the correlation among various messages. In an example, based on the type of message being exchanged, the aggregator may be configured to identify certain message fields to be matched between a send message and a receive message. In another example, the aggregator may implement rules governing the matching process, wherein if multiple potential send/receive message matches are identified based on an examination of one or more message fields, a refinement process is performed in order to identify a single send/receive message pair match.

In another example, the aggregator is configured to randomly select one or more fields of the "send message" to identify a subset of potential "receive message" matches. In this example, the aggregator may examine different combinations of message fields until a send/receive message pair is identified. The aggregator may further store the matched fields in association with the message type for use in conducting further match examinations. In this example, when an initial set of fields results in a send/receive message match, the combination of fields may be initially marked as a "provisional" combination until additional successful matches are made using that combination (e.g., such that the combination success rate exceeds a threshold and qualifies as a dependable/proven combination).

In yet another example, the content of specific fields in a message may be hashed to produce a hash value. The aggregator may then compare the hash values of various messages to identify inter-service communication correlations.

Having performed the above-described correlations, the aggregator may correlate the information received from the first service and the information received from second service to a common transaction being executed across services in a distributed computing environment. The aggregator may produce an activity trace for a transaction instance to be used as a source of information for transaction activity analysis (e.g., tracking the performance of activities associated with a business transaction).

Figure 4:
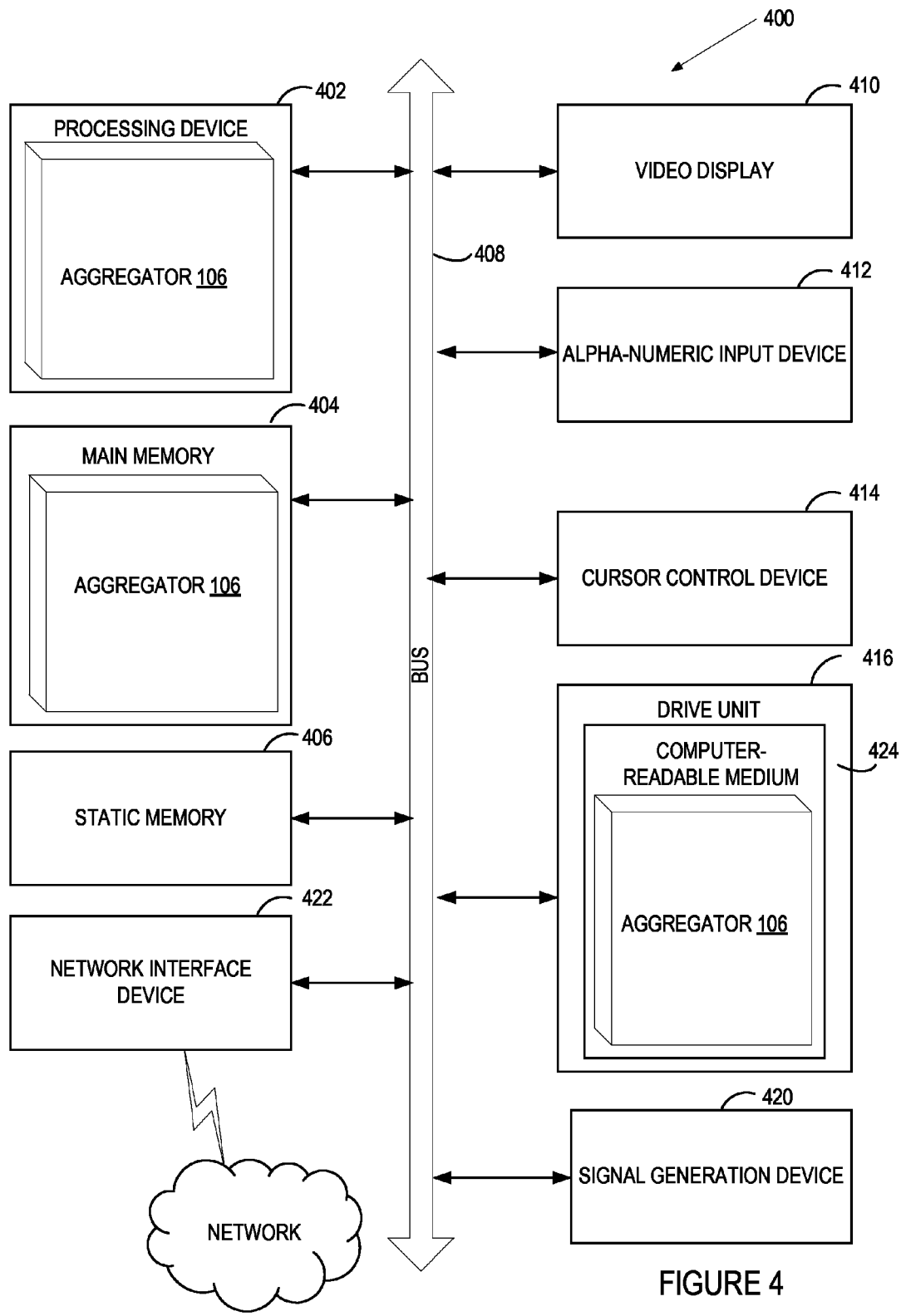
FIG. 4 illustrates a diagrammatic representation of an activity aggregation system, according to aspects of the present disclosure.

FIG. 4 illustrates an illustrative computer system within which a set of instructions, for causing the machine to perform any one or more of the methodologies discussed herein, may be executed. In alternative examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 400 includes a processing system (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions of an aggregator 106 for performing the operations discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored the aggregator 106 (e.g., instructions corresponding to the method of FIG. 3) embodying any one or more of the methodologies or functions described herein. The aggregator 106 may also reside, completely or at least partially, within the main memory 404 and/or within the processor 402 during execution thereof by the computer system 400, the main memory 404 and the processor 402 also constituting computer-readable media. Instructions of the aggregator 106 may further be transmitted or received over a network via the network interface device 422.

While the computer-readable storage medium 424 is shown in an illustrative example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another example, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "receiving", "identifying", "associating", "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other examples will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving, by a processing device from a first service collector, first intra-service activity information of a first service of a distributed computing environment, wherein the first intra-service activity information of the first service comprises a first inter-service message between the first service and a second service, and wherein the first intra-service activity information comprises information identifying a plurality of activities associated with a common thread of execution relating to a user request;
receiving, by the processing device from a second service collector, second intra-service activity information of the second service of the distributed computing environment, wherein the second intra-service activity information of the second service comprises a second inter-service message between the first service and the second service;
identifying, by the processing device, a first inter-service communication correlation linking the first intra-service activity information of the first service to the first inter-service message;
identifying, by the processing device, a second inter-service communication correlation linking the second intra-service activity information of the second service to the second inter-service message;

applying, by the processing device, a rule defining a selected time frame comprising a first span of time to identify an inter-service communication correlation linking the first inter-service message with the second inter-service message by determining the first inter-service message and the second inter-service message occur within the first span of time of the selected time frame; and associating, by the processing device, the first intra-service activity information of the first service with the second intra-service activity information of the second service using the inter-service communication correlation.

2. The method of claim 1, further comprising determining, by the processing device, a common transaction associated with the first intra-service activity information of the first service with the second intra-service activity information of the second service.

3. The method of claim 1, wherein the second intra-service activity information comprises information relating to a plurality of activities associated with a common business process identifier.

4. The method of claim 1, wherein identifying the inter-service communication correlation comprises identifying a unique message identifier within a payload of the first inter-service message and the second inter-service message.

5. The method of claim 1, wherein identifying the inter-service communication correlation comprises identifying a unique identifier within a header of the first inter-service message and the second inter-service message.

6. The method of claim 1, wherein identifying the inter-service communication correlation comprises identifying a global transaction identifier within a content field of the first inter-service message and the second inter-service message.

7. The method of claim 1, wherein identifying the inter-service communication correlation comprises:
selecting a plurality of fields within the first inter-service message occurring at a first time, wherein the first inter-service message comprises a send message;
combining content within the plurality of selected fields of the first inter-service message to generate an identifier for the first inter-service message;
selecting a plurality of fields within the second inter-service message occurring at a second time, wherein the second inter-service message comprises a receive message;
combining content within the plurality of selected fields of the second inter-service message to generate an identifier for the second inter-service message;
identifying a plurality of messages occurring within the time frame, wherein the selected time frame comprises the first time and the second time, and wherein the plurality of messages comprises the first inter-service message and the second inter-service message; and
identifying a match between the identifier for the first inter-service message and the identifier for the second inter-service message.

8. The method of claim 1, the processing device to identify a unique identifier within a header of the first inter-service message and the second inter-service message.

9. The method of claim 1, the processing device to:
select a plurality of fields within the first inter-service message occurring at a first time, wherein the first inter-service message comprises a send message;
combine content within the plurality of selected fields of the first inter-service message to generate an identifier for the first inter-service message;
select a plurality of fields within the second inter-service message occurring at a second time, wherein the second inter-service message comprises a receive message;
combine content within the plurality of selected fields of the second inter-service message to generate an identifier for the second inter-service message;
identify a plurality of messages occurring within the selected time frame, wherein the selected time frame comprises the first time and the second time, and wherein the plurality of messages comprises the first inter-service message and the second inter-service; and
identify a match between the identifier for the first inter-service message and the identifier for the second inter-service message.

10. A non-transitory computer readable storage medium comprising instructions that, when executed by a processing device, cause the processing device to:
receive, by the processing device from a first service collector, first intra-service activity information of a first service of a distributed computing environment, wherein the first intra-service activity information of the first service comprises a first inter-service message between the first service and a second service, and wherein the first intra-service activity information comprises information identifying a plurality of activities associated with a common thread of execution relating to a user request;
receive, by the processing device from a second service collector, second intra-service activity information of the second service of the distributed computing environment, wherein the second intra-service activity information of the second service comprises a second inter-service message between the first service and the second service;
identify, by the processing device, a first inter-service communication correlation linking the first intra-service activity information of the first service to the first inter-service message;
identify, by the processing device, a second inter-service communication correlation linking the second intra-service activity information of the second service to the second inter-service message;
apply, by the processing device, a rule defining a selected time frame comprising a first span of time to identify an inter-service communication correlation linking the first inter-service message with the second inter-service message by determining the first inter-service message and the second inter-service message occur within the first span of time of the selected time frame; and
associate, by the processing device, the first intra-service activity information of the first service with the second intra-service activity information of the second service using the inter-service communication correlation.

11. The non-transitory computer readable storage medium of claim 10, the processing device to determine a common transaction associated with the first intra-service activity information of the first service with the second intra-service activity information of the second service.

12. The non-transitory computer readable storage medium of claim 10, wherein the second intra-service activity information comprises information relating to a plurality of activities associated with a common business process identifier.

13. The non-transitory computer readable storage medium of claim 10, the processing device to identify a unique message identifier within a payload of the first inter-service message and the second inter-service message.

14. The non-transitory computer readable storage medium of claim 10, the processing device to identify a unique identifier within a header of the first inter-service message and the second inter-service message.

15. The non-transitory computer readable storage medium of claim 10, the processing device to identify a global transaction identifier within a content field of the first inter-service message and the second inter-service message.

16. The non-transitory computer readable storage medium of claim 10, the processing device to:
   select a plurality of fields within the first inter-service message occurring at a first time, wherein the first inter-service message comprises a send message;
   combine content within the plurality of selected fields of the first inter-service message to generate an identifier for the first inter-service message;
   select a plurality of fields within the second inter-service message occurring at a second time, wherein the second inter-service message comprises a receive message;
   combine content within the plurality of selected fields of the second inter-service message to generate an identifier for the second inter-service message;
   identify a plurality of messages occurring within the pre-selected time frame, wherein the selected time frame comprises the first time and the second time, and wherein the plurality of messages comprises the first inter-service message and the second inter-service; and
   identify a match between the identifier for the first inter-service message and the identifier for the second inter-service message.

17. A computer system comprising:
   a memory to store instructions; and
   a processing device operatively coupled to the memory, the processing device to execute the instructions to:
      receive, from a first service collector, first intra-service activity information identifying a first plurality of activities associated with a first common thread of execution relating to a user request of a first service of a distributed computing environment, wherein the intra-service activity information of the first service comprises a first inter-service message between the first service and a second service;
      receive, from a second service collector, second intra-service activity information relating to a second plurality of activities associated with a second common thread of execution of a second service of the distributed computing environment, wherein the second intra-service activity information of the second service comprises a second inter-service message;
      identify a first inter-service communication correlation linking the first intra-service activity information of the first service to the first inter-service message;
      identify a second inter-service communication correlation linking the second intra-service activity information of the second service to the second inter-service message;
      apply a rule defining a selected time frame comprising a first span of time to identify an inter-service communication correlation linking the first inter-service message with the second inter-service message to determine the first inter-service message and the second inter-service message occur within the first span of time of the selected time frame;
      associate the first intra-service activity of the first service with the second intra-service activity of the second service using the inter-service communication correlation; and
      determine a common transaction associated with the first intra-service activity information of the first service with the second intra-service activity information of the second service.

18. The system of claim 17, the processing device to identify a unique message identifier within a payload of the first inter-service message and the second inter-service message.

* * * * *